(12) United States Patent
Radwin

(10) Patent No.: US 7,007,074 B2
(45) Date of Patent: Feb. 28, 2006

(54) TARGETED ADVERTISEMENTS USING TIME-DEPENDENT KEY SEARCH TERMS

(75) Inventor: Michael Radwin, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 467 days.

(21) Appl. No.: 09/950,567

(22) Filed: Sep. 10, 2001

(65) Prior Publication Data

US 2003/0050863 A1    Mar. 13, 2003

(51) Int. Cl.
*G06F 17/60*    (2006.01)

(52) U.S. Cl. .................... 709/217; 709/227; 705/1; 705/14; 705/26

(58) Field of Classification Search ............ 709/217, 709/227; 705/1, 14, 26
See application file for complete search history.

(56) References Cited

U.S. PATENT DOCUMENTS

| | | | | |
|---|---|---|---|---|
| 5,933,811 A | * | 8/1999 | Angles et al. ............... | 705/14 |
| 6,144,944 A | * | 11/2000 | Kurtzman, II et al. ........ | 705/14 |
| 6,248,946 B1 | * | 6/2001 | Dwek ........................... | 84/609 |
| 6,308,202 B1 | * | 10/2001 | Cohn et al. .................. | 709/217 |
| 6,389,458 B1 | | 5/2002 | Shuster | |
| 6,405,175 B1 | | 6/2002 | Ng | |
| 6,460,036 B1 | * | 10/2002 | Herz ........................... | 707/10 |

* cited by examiner

Primary Examiner—Richard Chilcot
(74) Attorney, Agent, or Firm—Brinks Hofer Gilson & Lione

(57) ABSTRACT

An advertisement generation system presents a time-dependent advertisement to a user based upon to a search term of a search query during a period of time via a communication network. The system includes a search engine coupled to a web server for receiving the search query and for presenting a search results page. The search results page is accompanied with an immediate advertisement. In one embodiment, the system includes an advertisement repository to store data representing a plurality of advertisements and includes the immediate advertisement and the time-dependent advertisement. Also, the system includes a user profiler configured to communicate a plurality of search characteristics and includes a data structure to store the search characteristics. Lastly, an advertisement server is included to provide to the web server the immediate advertisement with an associated search results page and the time-dependent advertisement with a web page presented after the display of the search results page, until a period of time expires.

28 Claims, 9 Drawing Sheets

| ID | Ad Type | Ad Index | Keyword Flag | Import Wtg. |
|---|---|---|---|---|
| 1 | Apparel | $A_1$ | 0 | 2 |
|  |  | $A_2$ | 1 | 0 |
|  |  | ⋮ | ⋮ | ⋮ |
|  |  | $A_n$ | 0 | 9 |
| 2 | France | $B_1$ | 0 | 0 |
|  |  | ⋮ | ⋮ | ⋮ |
|  |  | $B_n$ | 1 | 0 |
| 4 | Vacation | $C_1$ | 0 | 0 |
|  |  | ⋮ | ⋮ | ⋮ |
|  |  | $C_n$ | 0 | 7 |
| 6 | Apparel/Footwear | $D_1$ | 0 |  |
|  |  | ⋮ | ⋮ |  |
|  |  | $D_n$ | 0 |  |
| 19 | Europe | $E_1$ | 0 | 0 |
|  |  | ⋮ | ⋮ | ⋮ |
|  |  | $E_n$ | 0 | 0 |
| 26 | Auto Rental | $F_1$ | 1 |  |
| 93 | Tool Rentals | $G_1$ | 0 |  |
| 154 | Food & Beverages | $H_1$ | 0 |  |
| 441 | Auto Sales | $I_1$ | 0 |  |
| 593 | Auto Repair | $J_1$ | 0 |  |

*FIG. 5*

TARGETED ADVERTISEMENTS USING TIME-DEPENDENT KEY SEARCH TERMS

BACKGROUND OF THE INVENTION

Use of the Internet by the general public is gaining popularity. More and more people are getting access to the Internet and the vast amount of information that it provides. Along with the rapid increase in the number of Internet users, advertising on the Internet has consequently become an important priority for many advertisers.

As a result, for web portals and ISPs, a significant amount of revenue is generated from displaying advertisers' ad banners on web sites or web pages. For example, for a preeminent portal such as Yahoo!® which is visited daily by hundreds of thousands, if not millions of users, considerable revenue is generated by displaying an advertiser's advertisements on its web sites or web pages.

For web portals like Yahoo!, advertisers generally pay a fee for each advertisement viewed by web users. Contracts to present advertisements are normally signed well in advance of delivery, from several weeks to months. The duration of contracts ranges from one day to multiple years. Typically, there are several types of contracts, including regular contracts, exclusive contracts and non-exclusive contracts. For regular contracts, the advertisers purchase a designated number of ad views on a chosen space (web page). A type of regular contract is based upon the CPM (i.e., cost per thousand impressions or views) generally linked to, for example, a specific web page or search term. Under a CPM arrangement involving a search engine, a particular advertisement will have a set cost corresponding to a guaranteed number of times (per 1,000 matches or views) a term is searched during a period of time. For exclusive contracts, advertisers purchase all the ad views on a chosen web page or search term. A type of exclusive contract might be a CPM contract excluding all other advertisers from using a specific search term or sequence of search terms.

For non-exclusive contracts, the advertiser purchases leftover ad views on a chosen space not reserved under an exclusive contract after other regular contracts related to that space have been fulfilled. Such advertisements, referred to herein as "run of network" ads, are generally displayed "out-of-context." An advertisement is out-of-context if it is displayed on a space or web page unrelated to the subject matter of the advertisement. Run of network ads are less desirable from an advertiser's viewpoint because users generally are less likely to respond to advertisements that are unrelated to a user's interest in the particular space. Consequently, run of network ads command a lower price, and thus generate less revenue than advertisements based upon regular and exclusive contracts.

Like advertising delivered through more traditional media, such as TV or printed publications, advertising on the Internet is similarly subject to physical and temporal limitations. For obvious reasons, it is a natural and often most selected choice for advertisers to request ad views on the more relevant web pages for maximum exposure to a targeted audience. However, since there is a finite amount of physical space on a web page, demand for ad space or ad views on relevant web pages often exceeds supply. If such demand cannot be serviced (i.e., advertisements cannot be displayed according to the advertiser's wishes), then revenue otherwise derived therefrom will not be realized.

For web portals, like Yahoo!, advertisements are displayed on web pages resulting from a user-defined search based upon one or more search terms. Generally, there are more advertisers interested in targeting their advertisements based on frequently used search terms than there is room or means to accommodate such advertisements. For example, in an exclusive contract, an advertiser of baby books has rights to all occurrences, each, of one or more keywords associated with a user's search, such as "books" and/or "baby." Other advertisers of books, however, will have no opportunity to key their respective advertisements to the term "books" and thus may have only the less favorable run of network ads as a consideration.

A common approach to improving the effectiveness of presenting targeted advertisements to those users interested in receiving product information from various sellers is to employ demographic characteristics (i.e., age, income, sex, occupation, etc.) for predicting the behavior of groups of different users. Advertisements then will be presented to each user in a targeted audience based upon predicted behaviors rather than in response to certain keyword search terms.

This approach, however, has significant drawbacks. Since users generally declare their demographics upon registering for an email or My Yahoo! account, for example, users sometime provide inaccurate information about their demographics, such as claiming to be female rather than male. Another disadvantage of demographic ad targeting is that there are underlying assumptions that are not necessarily accurate. For example, advertisers might presume that if one is a doctor, then that person would be interested in golf. The effectiveness of demographic ad targeting is thus impaired by the assumptions in which it is based upon.

Another convention approach is profile-based ad targeting. In this approach, user profiles specific to each of the users are generated to model user behavior, for example, by tracking each user's path through a web site or network of sites, and then compiling a profile based on what pages and advertisements were delivered to the user. Using aggregated data, a correlation develops between users in a certain target audience and the products that those users purchase. The correlation then is used to target potential purchasers by targeting content or advertisements to the user at a later time.

A disadvantage to using profiling to target advertisements is that there are inherent latencies in the time it takes to build up each user's profile. Such behavior profiling often uses data-mining techniques to determine trend information from ad server log files. Such data-mining techniques are then used to model behaviors of each targeted audience. Behavior modeling, however, has inherent latencies in predicting a new user behavior from the time the user first exhibits such behavior, which can take days to link an appropriate advertisement to a new consumer behavior. Hence, advertisements linked to behavior modeled features will not have an optimum exposure to the targeted audience.

A further conventional approach is advertisement queuing, where a fixed number of advertisements are each queued to display on subsequently presented web pages. In keyword advertising applications, this approach allows advertisers to present their advertisements to users subsequent to the presentation of a search results page and a corresponding keyword advertisement. A drawback to this approach, however, is that such queued advertisements are generally run of the network ads and are of no, or very low, interest to the particular user performing the search.

Therefore, there is need for a system and method for presenting advertisements to targeted users who are interested in such product or service information nearly immediately following the presented results of a keyword search. Such a system and method decreases the latency between the time that the user exhibits some behavior on the web site and the time that an advertiser capitalizes on that behavior for ad-targeting. Furthermore, there is a need to capture ad revenue that otherwise would be lost using conventional ad-targeting techniques by presenting a targeted advertisement to a unique user.

SUMMARY OF THE INVENTION

An improved advertisement generation system is herein described that takes into account a previous search term for conducting a search, typically with a search engine, and the time at which the search was conducted, when selecting an advertisement to present to a potential consumer. For example, the time-dependent advertisement is presented to a user's computing system based upon a search query during a period of time. The advertisement generation system includes a search engine and a web server.

In one embodiment of an exemplary advertisement generation system, an advertisement repository includes immediate and time-dependent advertisements and a user profiler is configured to communicate search characteristics associated with various search terms entered by the user. Furthermore, the present invention includes an advertisement server configured to provide to the web server the immediate advertisement with an associated search results page and a time-dependent advertisement with a web page presented after the display of the search-results page. The time-dependent advertisement is associated with at least one of the search terms of the search query, where the time-dependent advertisement is a targeted advertisement based upon the search characteristics of the user and is available for presentation to the user until the period of time expires. Such a time-dependent advertisement is also referred herein as a future advertisement in some embodiments of the present invention.

In another embodiment, the present invention provides the user a first web page to conduct a search, accepts a first search term to determine the contents of a search result, stores the first search term, presents concurrently a search result page and an associated immediate advertisement to the user, selects the time-dependent advertisement when the user has selected another web page and presents the time-dependent advertisement, so long as the time-dependent advertisement is available for selection during a period of time after presentation of an associated immediate advertisement.

A further understanding of the nature and advantages of the inventions herein may be realized by reference to the remaining portions of the specification and the attached drawings.

BRIEF DESCRIPTION OF THE DRAWINGS

FIG. 5 is a flowchart depicting an alternate embodiment of the method of the present invention;

DESCRIPTION OF THE SPECIFIC EMBODIMENTS

The present invention relates to a system and a method for presenting to a user a selected advertisement from an advertisement repository containing a large number of advertisements. An exemplary advertisement generation system includes a web server coupled between a search engine and an ad server according to one embodiment of the present invention. Over a communication network, the web server receives a search query having one or more search terms and provides such terms to the search engine. The web server then presents the search results web page containing documents or a list of references to each of the documents associated with the terms searched. Such documents described herein are records in a search database (not shown), where the search database is organized, for example, as a hierarchical structure of categories and site references.

In a substantially parallel process to the generation and the presentation of the search results page, the web server also presents a keyword advertisement based in part, upon the search terms, as determined by the ad server. Thereafter, as the user navigates from the search results web page to another web page, the ad server accesses previously stored search terms and determines which of the advertisements within the advertisement repository will be presented to the user as a time-dependent advertisement. "Web pages" herein refers to a single hypertext document which forms part of a web site, where "web site" refers to a collection of one or more web pages which are controlled (i.e., modifiable) by a single entity or group of entities working in concert to present a site on a particular topic.

Figure 1:
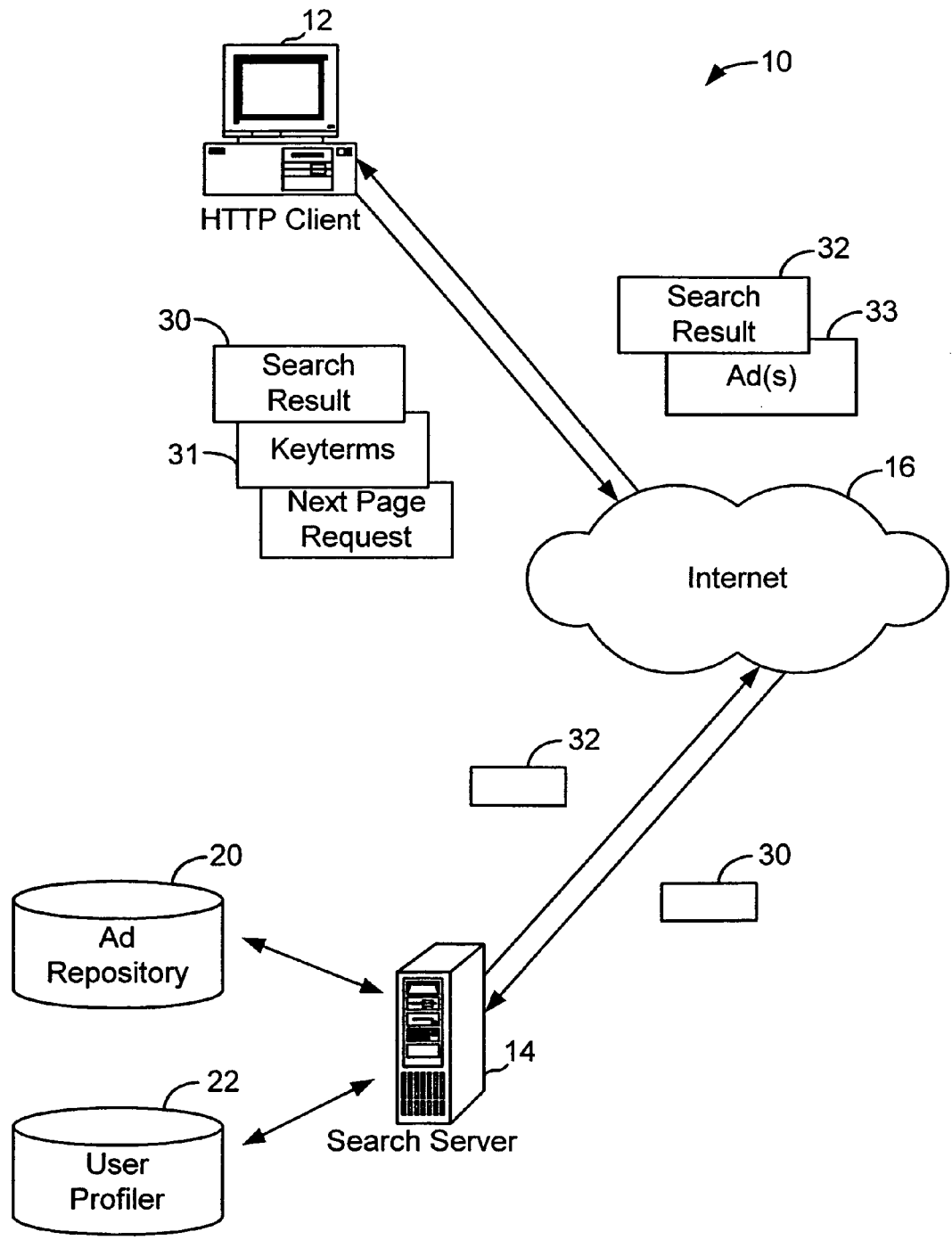
FIG. 1 is a simplified network diagram showing an embodiment of the present invention.

FIG. 1 shows an example of a client-server system 10 in which a search database is queried in accordance with the present invention. System 10 is shown comprising an HTTP client 12 connected to a search server 14 via Internet 16. Search server 14 is coupled to an advertisement repository 20 and a user profile index 22 and responds to a search query having one or more search terms 30 with a search result 32. Search server 14 is configured to reliably pass data using the TCP/IP (Transport Control Protocol/Internet Protocol) via the Internet and other and computers network systems from a source node (e.g., client) to a destination node (e.g., web server). A variety of higher level protocols is used on top of TCP/IP to transport objects of digital data, the particular protocol depending on the nature of the objects. For example, hypertext documents and their associated effects are transported using the Hypertext Transport Protocol (HTTP).

In this specific example, HTTP client 12 is a browser, but other HTTP clients, such as search back-end processors, could be used instead of a browser. Also, it should be understood that system 10 could be implemented with Internet 16 replaced with an alternate communications channel between HTTP client 12 and search server 14. Furthermore, it should be understood that while search server 14 is an HTTP server, it could handle requests using an entirely different protocol, so long as the different protocol is understood by HTTP client 12 or its substitute. For brevity, only one HTTP client, one request and one response is shown, but it should be understood that in practice many clients will be accessing search server 14 substantially simultaneously, each with one or more search requests. In fact, if warranted, the tasks of search server 14 might be spread over multiple machines. If the tasks are spread over multiple machines, the preferred arrangement is to have the multiple machines presented to the clients as a single logical machine, to simplify client access.

In operation, a user at a browser, or other HTTP client, sends a request 30 (i.e., search query) containing a search term 31 to search server 14 where search server 14 parses the one or more search terms 30 and uses the search terms to find advertisements in advertisement repository 20 that, among other things, match the one or more search terms of a search query. Search server 14 responds by serving up a search results page 32 comprising either a list of matching documents or the documents themselves as well as either a keyword advertisement or a time-dependent advertisement 33. "Time-dependent" advertisements in connection with the described system and method are available for presentation during a period of time until the time period expires and are alternatively described herein as "time-delayed" advertisements. Moreover, the time-dependent notation also refers to a future advertisement which is available for selection and presentation to a user with a later presented web page at some time after the search results is presented to the user that initiated a search query. User profiler 22 is used to provide, during a period of time, the search terms available from cumulative search queries to the search server 14. In response to a request from the search server 14, the advertisement repository 20 provides a targeted advertisement to the search server 14 for presentation to the user at HTTP client 12. HTTP client 12 is then configured to communicate a next page request 34 to the search server 14 as explained later.

Figure 2:
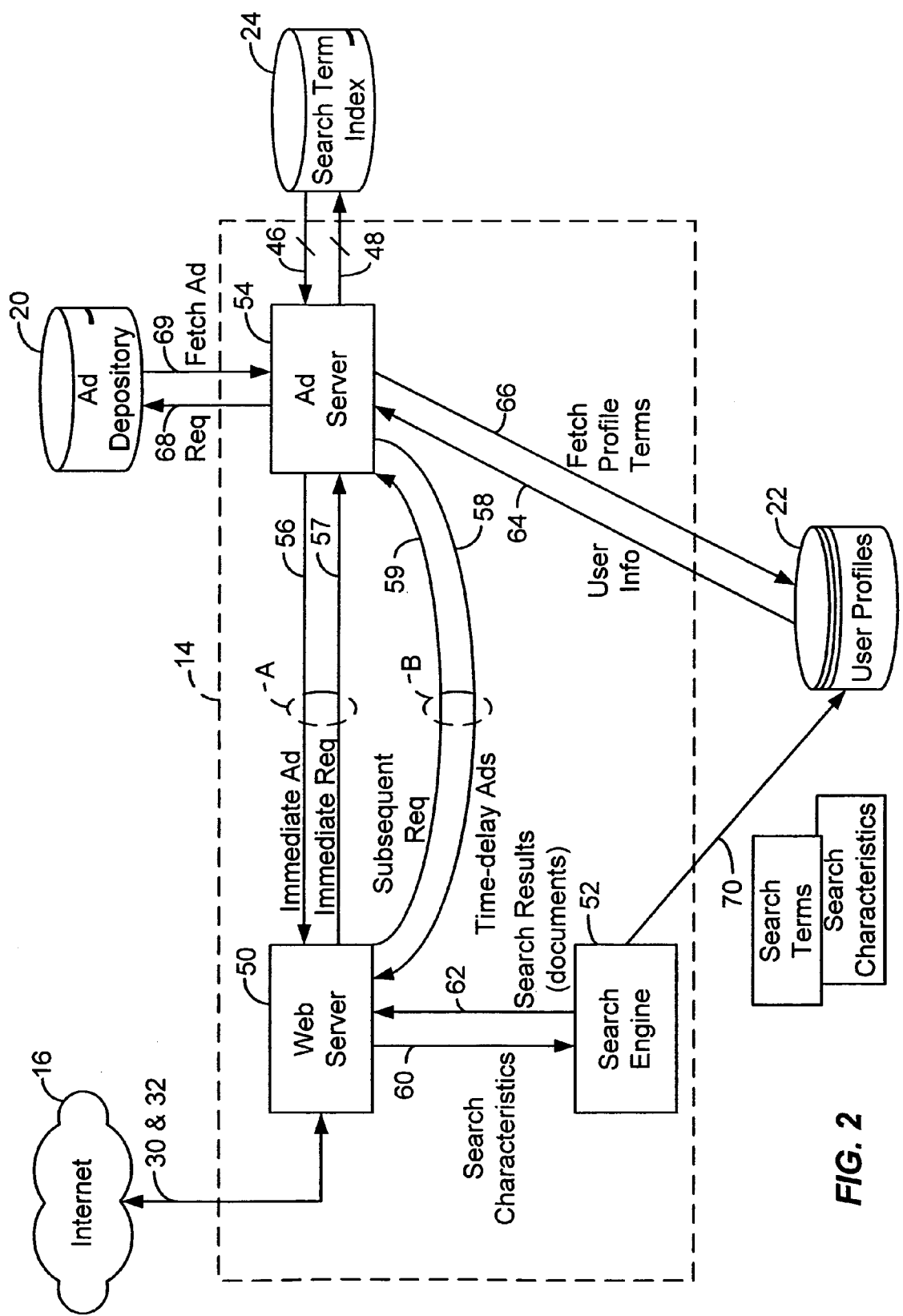
FIG. 2 is a more detailed block diagram of FIG. 1 and illustrates the elements of an exemplary embodiment of the present invention.

FIG. 2 illustrates a more detailed depiction of an exemplary advertisement generation system of FIG. 1. In a specific embodiment of the exemplary advertisement generation system, search server 14 includes web server 50, search engine 52 and ad server 54. In one embodiment, the web server 50 is electrically coupled between search engine 52 and ad server 54. The web server 50 is configured to receive a uniform resource locator (URL) and the Web server, among other things, is further configured to return a Hypertext Markup Language (HTML) document for the browser to display. The browser is one example of an HTTP client and is so named because it displays the returned hypertext document and allows the user an opportunity to select and display other hypertext documents referenced in the returned document. The web server is an Internet node that returns hypertext documents requested by HTTP clients.

Web server 50 operates as a web site that offers a collection of linked hypertext documents controlled by a single person or entity. Since the web site is controlled by a single person or entity, the hypertext documents, often called web pages in this context, have a consistent look and subject matter. Web server 50 is configured to receive one or more search terms 30 of a search query initiated by a user over the communications network 16 and is configured further to receive the search results 62. For each search query received, web server 50 determines and assigns respective search characteristics 60 to each of the search terms of the query, including the search terms themselves. Such characteristics 60 may be determined from the nature of the search terms or may be received from the user. For example, one search characteristic is a user ID associated with particular terms to a respective user. Another search characteristic is a time stamp associated with particular terms and indicates the time at which the search term 30 was used to perform a search query. It should be understood that a skilled artisan might employ other search characteristics to enhance the novel features within the scope of the present invention.

Web server 50, in addition to serving static documents, can return dynamic documents. A static document is a document that exists on a web server before a request for the document is made and for which the web server merely sends out the static document upon request. A static page URL is typically in the form of "host.subdomain.domain.TLD/path/file" or the like. That static page URL refers to a document named "file" which is found on the path "/path/" on the machine which has the domain name "host.subdomain.domain.TLD." An actual URL refers to, for example, the machine (or machines) designated "www" at the domain "yahoo" in the ".com" top-level domain (TLD). By contrast, a dynamic document is a document that is generated by the web server when it receives a particular URL, which the server identifies as a request for a dynamic document.

Search engine 52 is configured to receive the search characteristics 60 and is configured to provide the search results 62 to web server 50 for presentation to the user. In operation, search engine 52 searches a hierarchical document repository (not shown) and returns documents which match one or more search terms 30 either directly or indirectly, wherein a direct match is a document which matches all of the search terms 30 queried and an indirect match is a document which only matches each of the search terms 30 when contents of the indirectly matching document are combined with contents of the indirectly matching document's ancestor documents in the hierarchy. A search engine suitable for implementing some of the embodiments of the invention are described in U.S. Pat. No. 5,991,756, entitled "INFORMATION RETRIEVAL FROM HIERARCHICAL COMPOUND DOCUMENTS," assigned to the assignee of the present invention, and herein incorporated by reference.

Figure 3:
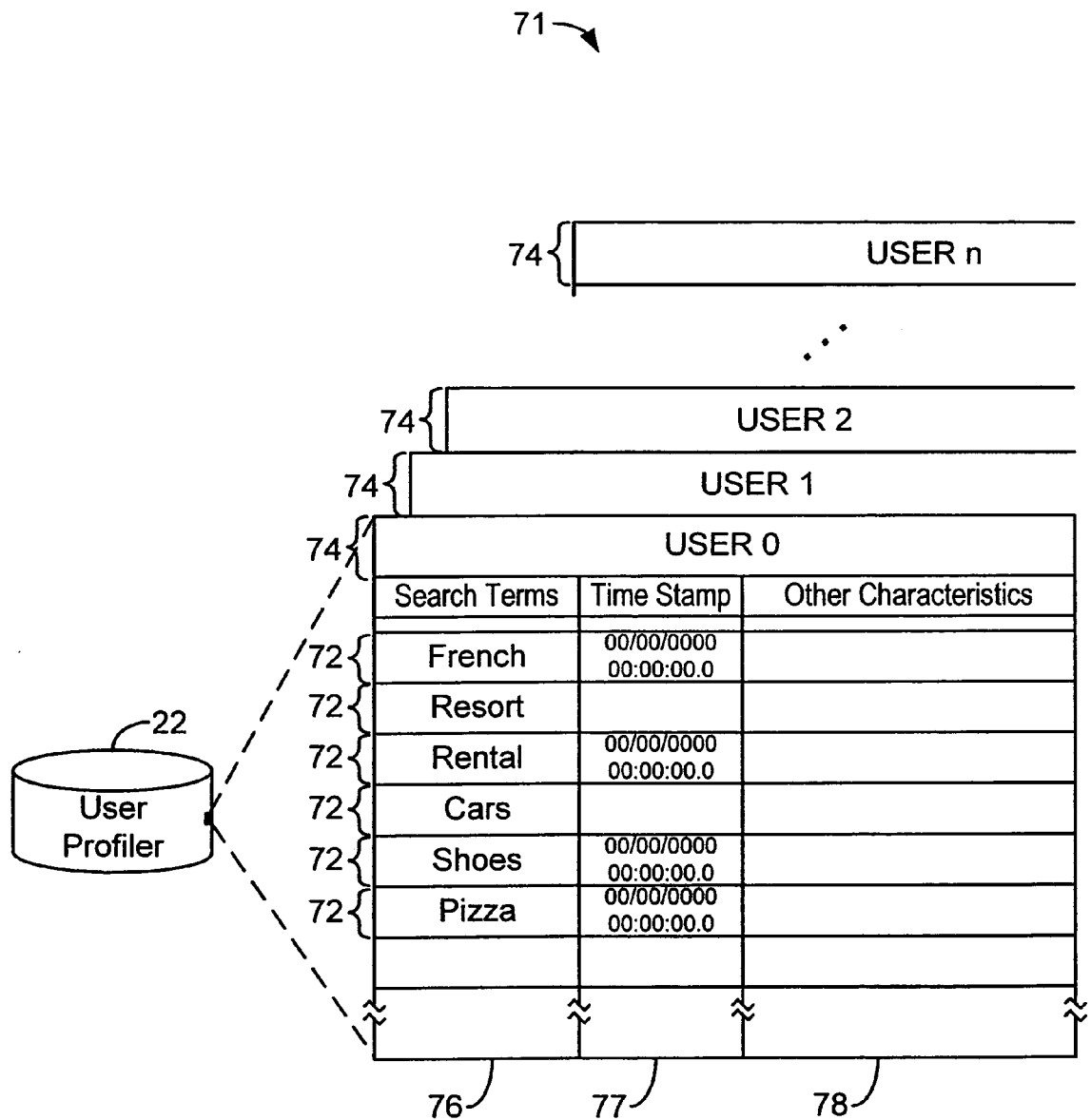
FIG. 3 is a block diagram depicting the elements of another embodiment of the present invention.

Search engine 52 is electrically coupled to user profiler 22 to provide search characteristics 70, including the search terms themselves. Furthermore, user profiler 22 is configured to provide user profile information 64 to ad server 54 and is configured further to receive a request 66 for user information, which will be discussed below. As shown in FIG. 3, user profiler 22 includes the necessary processing logic to receive, to store and to locate search characteristics 70, which includes search terms 30 from multiple search queries. User profiler 22 is organized as a plurality of records 72 for each user associated with user ID 74, where each record 72 corresponds to a search term 76. For example, a small subset of the contents of user profiler 22 is shown in FIG. 3.

In a specific embodiment, user profiler 22 is arranged in multiple user profile arrays 71, where each array 71 contains search characteristics that correspond with a user ID 74. Typically, array 71 is stored in shared memory for quick access, where such memory may be RAM, a computer disk, or any other read-write computer medium having read-write capability. Array 71 has one record per search term 76 and each record 72 at least includes certain fields for storing a search term 76, a time stamp 77 and other search characteristics 78 used to facilitate time-dependent advertising according to the exemplary advertisement generation system.

As an example, suppose a user, Ms. X, desires information to prepare for a European vacation. Such a user might enter a search expression of "French Resorts" at 4:00 p.m. According to an exemplary advertisement generation system, the search terms "French" and "Resorts" are provided to the search engine 52 to generate search results. Furthermore, the terms are also supplied to the user profiler 22 for storage as records 72 in the data structure exemplified in FIG. 2. A time stamp indicating the date and time is also associated with each of those records. At 7:00 p.m. the same day, Ms. X, interested also in obtaining information on renting a car during her trip, commences another search query including the terms "Rental Car." Similar to the previously used terms, "Rental" and "Car" are also stored as records 72 in an array 71 associated with Ms. X with a corresponding time stamp 77 indicating the time of search (e.g., 7:00 p.m.).

The search terms are used to determine which of the advertisements 38 in the advertisement repository 20, as shown in FIG. 5, is to be selected for presentation to the user. Referring back to FIGS. 2 and 3, the search term 76 defines the subject matter of the advertisement which is to be categorized for presentation and also provides the means which advertisement server 54 uses to access each of the records 72 for each of the users. The time stamp 77 identifies the time that the search term was last used to conduct a search by search engine 52. It should be understood that the user profiler 22 data structure, as shown, represents one of many possible data arrangements. Only a few records 72 are shown, but in practice, many millions of records might be present. Furthermore, the selected advertisement is associated, for example, with a physical disk location of the advertisement in advertisement repository 20, where the advertisement repository is a disk drive. It should be understood that there is a variety of physical embodiments where records 72 reside and a skilled artisan recognizes such mediums of storing the records.

Figure 4:
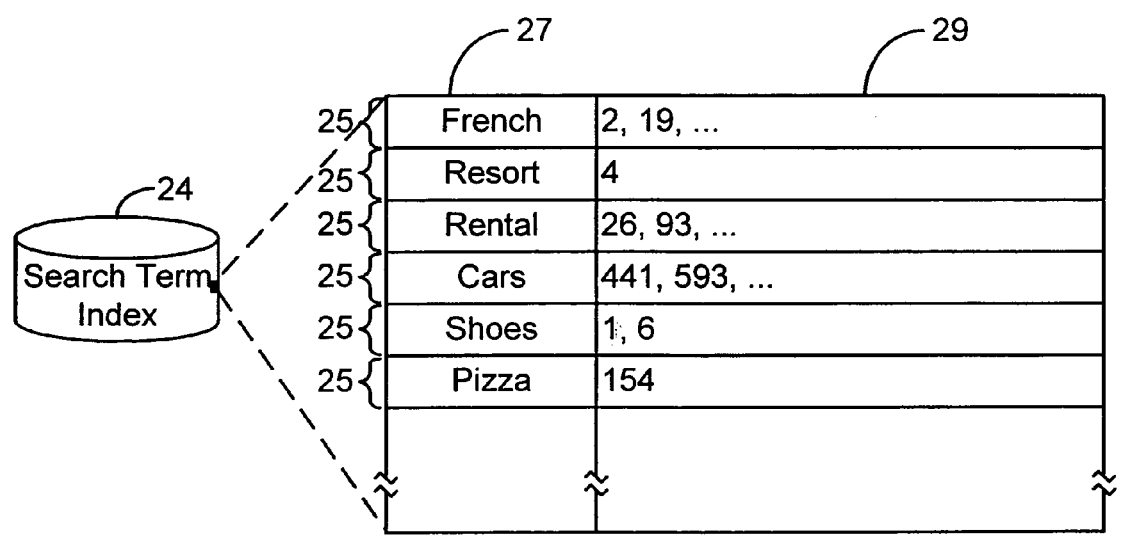
FIG. 4 is a flowchart depicting an exemplary method according to the present invention.

In one embodiment of the advertisement generation system, search term index database 24 is electrically coupled to advertisement server 54 to receive search terms 48 used by a particular user and returns a match list 46. Search term index 24 is organized as a plurality of records 25, with one record per term. As shown in FIG. 4, the search term index database 24 is organized, for example, as a table of match tags 27 associated with a list of numbers 29. A match tag 27 is a word (i.e., search term) or search element, depending on what the query term is. The structure might be automatically generated, but in the embodiment known as the Yahoo! search term index database 24, the advertisement types are placed in that list 29 corresponding to appropriate match tags 27 by an editorial staff using the experience and suggestions of advertisers. Each record 25 in search term index database 24 is shown with a tag 27 identifying the search term, followed by a list of numbers 29. As shown in FIG. 5, these numbers represent the list of advertisement types 42 associated with one or more advertisements 44 available for presentation. Therefore, each search term record is to be searched to verify whether it contains at least one advertisement type 42 associated with a particular user.

The search term index database 24 returns a match list 46 to search server 14. The match list 46 is a list of all the advertisement types 42 which are associated with all of the search terms 76 associated with the user's search query. In one aspect of the index database of FIG. 4, the match tags are associated with one or more advertisement categories wherein each number 29 on the match list refers to a single advertisement type 42. For example, search term index database 24 shows records 25 with match tags "French," "Resort," "Rental," and "Car," each respectively associated with a list of advertisement type numbers {2, 19, . . . }, {4}, and {26, . . . }, and {441, 593 . . . }.

Referring back to FIG. 2, after ad server 54 receives user info 64 from user profiler 22, the ad server uses the search terms 48 to search though the search term index database 24 to find corresponding advertisement type numbers. Since the match tags shown are text, "matching" occurs when the record contains the match tag as a string or sub-string of the search terms. Upon matching search terms to the tags of each of the records 25, the search term index database 24 then provides a match list 46 back to the ad server. Referring back to the example, after a user's first two search queries (i.e., "French," "Resort," "Rental," and "Car"), a match list will be returned to ad server 54 including at least advertisement types 2, 4, 19, 26, 93, 441, and 593. It should be understood, however, that the search term index database 24 facilitates presentation of advertisements and its absence is not critical to practice the present invention.

Advertisement repository 20 is electrically coupled to the search server 14 with advertisement request line 68 and fetch advertisement 69. The advertisement request 68 is configured to communicate a request from ad server 54 to the advertisement repository 20 for selecting one or more ads to present to a particular user and the fetch advertisement 69 is configured to convey the selected advertisements from advertisement repository 20 to ad server 54. FIG. 5 shows one embodiment of the advertisement repository 20 having a large number of records 38 in a table data structure associated with a number of advertisements for presentation to a user. More specifically, each record 38 is shown to include an advertisement type number 40, an advertising type 42, one or more advertisements 44 (e.g., individual advertisements A1, A2, . . . , An) and a keyword flag 45.

In one embodiment, advertisement repository 20 is a hierarchical data structure of categories and advertisements, where an advertisement type number corresponds to a category of advertising that includes at least one advertisement. Each of the advertisements 44 is hierarchically sub-categorized under one or more advertisement type 42. Each advertisement type number 40 corresponds with an advertising type 42 and is used to determine which advertisement 44 is to be selected for presentation based upon the match list 46 returned by the search term index database 24. For example, an advertiser for a French rental car agency may request an advertisement 44 to be placed under advertisement type "France" and "auto rental" advertisement types, where the advertisement placed under the "France" advertisement type is keyword advertisement Bn. Hence, if a search query includes any search terms which correspond to match tags 27 shown in FIG. 4, then the advertiser's advertisements will be made available when a match list 46 includes at least advertisement types 2 and 26, for France and Auto Rental, respectively.

The hierarchical structure of advertisement repository 20 might be automatically generated, but in the embodiment known as the Yahoo! search term index database, the advertisements are placed in a list corresponding to the appropriate advertising type by an editorial staff according to the terms of advertising agreement as well as experience and suggestions from the respective advertisers. The editorial staff also evaluates each advertisement submission and adds, in some cases, a keyword flag for immediate presentation with the search results page and/or an advertisement importance weighting value.

The advertisement importance weighting value 47 is a value set automatically, or by an editorial staff member, to indicate how valuable and/or relevant a particular advertisement type or advertisement is relative to other advertisement types and advertisements. The importance weighting value 47 of a particular advertisement associated with an advertisement type might be adjusted based on external events or the significance of an advertisement. For example, under a CPM arrangement, an advertisement is guaranteed to have a number of impressions per time period (e.g., per month). If the number of impressions is predicted to below a guaranteed minimum, an appropriate advertisement importance weighting value may be assigned to that advertisement. If assigned a higher weighting by the editorial staff, the advertisement will have a relatively higher probability of being selected by the ad server 54 than it otherwise would have been. Returning to the previous example, as shown in FIG. 5, since advertisements Al and An are not keyword advertisements, they have a lower probability of being presented as a keyword flagged A2. An, however, has been assigned an importance weighting of 9 and thus might be shown before advertisement Al. If advertisement An is under a CPM arrangement, the number of guaranteed impressions probabilistically increases commensurate with the weighting score. Of course, other weighting factors, might override the importance weighting or be combined with it to form an overall weighting.

Referring back to FIG. 2, search server 14 also includes ad server 54 to determine which advertisement from advertisement repository 20 is most appropriate to present to a user based upon that user's profile in user profile 22. Ad server 54 is coupled to the web server 50 to receive immediate advertisement request 57 and subsequent advertisement request 59 and is coupled further to provide the web server 50 immediate advertisement data 56 and time-delay advertisement data 58, respectively.

Exemplary ad server 54 is a computer system, similar in structure to web server 50, including a central processing unit (CPU) configured to execute computer programs (including an application and operating system software) stored in a program memory (not shown) by reading program instructions from the program memory via a processor bus. The CPU uses program memory, such as RAM (random access memory), for storage of program variables and for computational processes performed under control of application software. Ad server 54 is further configured to access and to communicate data to and from the user profiler 22, search term index database 24, web server 50 and advertisement repository 20.

In a specific embodiment, ad server 54 functions under control of a proprietary computer program residing on a computer medium, such as a hard disk drive, accessible to the ad server. The ad server 54 operates to determine whether an advertisement request from the web server 50 is either an immediate advertisement request 57, or is a subsequent advertisement request 59. An immediate advertisement request 57 provided to ad server 54 is used to fetch an immediate advertisement that accompanies the display of a search results page. The immediate advertisement request 57 is generated by the web server 50 nearly in parallel with the initiation of a search by web server 50 with search engine 52.

The request for an immediate advertisement 57 corresponds to at least one keyword search term submitted by a user in a search query. Ad server 54 receives the immediate advertisement request 57 and responds by selecting an advertisement having a keyword flag 45 set. A keyword flag 45, for example, resides in a register in program memory (not shown) or as a part of a record of advertisement repository 20 of FIG. 5. A keyword flag 45 is associated with each advertisement and indicates whether a specific advertisement is to be presented when a certain search term is used to provide the results of a search query. For example, keyword term "France" may be set to 1 to indicate that particular advertisement, such as an advertisement for a French auto rental agency, is to be presented with the search results page. Such keyword terms are generally subject to an exclusive contract prohibiting other advertisements from being shown when a particular keyword search term is queried, whether alone or in combination with other terms.

Upon selecting the most appropriate advertisement to present, as shown in FIG. 2, ad server 54 sends an immediate advertisement in immediate advertisement data 56 to web server 50. The web server 50 then presents to the user the immediate advertisement which is to accompany the search results generated by the search engine. The immediate advertisement data 56 includes information, for example, to display the advertisement as a banner, as streaming video, as an audio advertisement, or in other media discernible to human perception. In one aspect, the immediate advertisement data provides additional information for practicing the present invention, such as a cookie, as discussed below.

As with the example of user Ms. X, her first search using the terms "French" and "Resorts" will generate a match list corresponding to advertisement types 2, 4 and 19 for France, Vacation and Europe, respectively. Since Bn is the only advertisement qualified to be presented as an immediate advertisement, since its keyword is set, when the results of Ms. X's search are presented, immediate advertisement Bn will accompany it. Thus, the French rental car agency will be assured an impression.

After the user is presented the immediate advertisement data 56 with the corresponding search results, the user generally selects one or more of the displayed hypertext linked documents. These links are associated with other web pages having contents of interest to the user. Upon selection of a new link, web server 50 operates to serve either a static or dynamic hypertext document according to methods well known in the art. While the web server 50 initiates retrieval of the web page from a hierarchical document repository (not shown), the web server 50 also initiates a subsequent request 59.

The subsequent request 59 is provided to ad server 54 to request the most appropriate time-dependent advertisement to be presented with the contents of the selected web page. Ad server 54 operates to determine which advertisement 44 of the many advertisements in the advertisement repository 20 is to be presented to the user as a time-dependent advertisement. A time-dependent advertisement is an advertisement 44 having an advertisement type 42 corresponding to a search term 76 previously used by the same user 74 to perform an earlier search until that particular search term 76 is no longer available (i.e., expired). Time stamp 77 of FIG. 3 is used by the ad server 54 to determine whether a search term is to be considered when fetching a time-dependent advertisement from the advertisement repository. One having ordinary skill in the art should realize that FIG. 2 depicts the immediate ad and time-delay ad as separated only for illustrative purposes and need only be depicted as a single ad. This is true for the immediate and subsequent requests as well.

Returning to the example of user Ms. X, her second search using the terms "Rental" and "Car" will generate a match list corresponding to at least advertisement types 26, 93, 441, 593 for Rental Tools, Rental Cars, Auto Sales, and Auto Repair, respectively. Since F1 is the only advertisement qualified to be presented as an immediate advertisement, since its keyword is set, when the results of Ms. X's search are presented, immediate advertisement F1 will accompany it. Thus, if F1 was an advertisement for a German rental car agency, that advertisement will be assured an impression. Assume Ms. X is presented a hypertext link for an American rental car agency with a subsidiary in France. If Ms. X selects the link, the web server will serve up the hypertext document. Additionally, the web server will present a time-dependent advertisement. So long as the "Resort" search term has not expired, a corresponding advertisement, such as advertisement C1, will be available for presentation as a time-dependent advertisement.

Ad server 54 determines which advertisement 44 of those stored in advertisement repository 20 will be presented as a time-dependent advertisement, according, among other things, to the corresponding importance weighting values discussed above. For example, ad server 54 will verify that the advertisements under consideration as a time-dependent advertisement must not also be a keyword advertisement exclusive to a particular search term. If an advertisement is a non-keyword advertisement (i.e., keyword flag is zero), the advertisement that is selected as a time-dependent advertisement may provide the most revenue, or alternatively, may best meet CPM obligations. More specifically, certain advertisements may bring more money than other advertisements per impression. Furthermore, certain advertisements may be further away from guaranteeing a certain number of impressions per time period and thus must have the frequency of presentation increased to meet CPM targets. It should be understood that other weighting factors may be considered in determining which of the non-keyword advertisements are to be presented as a time-dependent advertisement.

Once the optimum advertisement 44 for presentation is determined, ad server 54 provides web server 50 the time-dependent advertisement in time-dependent advertisement data 58. The time-dependent advertisement data 58 includes information, for example, to display the advertisement as a banner, as streaming video, as an audio advertisement, or in other media discernible to human perception, and may also include additional information for practicing the present invention, such as a cookie, as discussed below.

Figure 6:
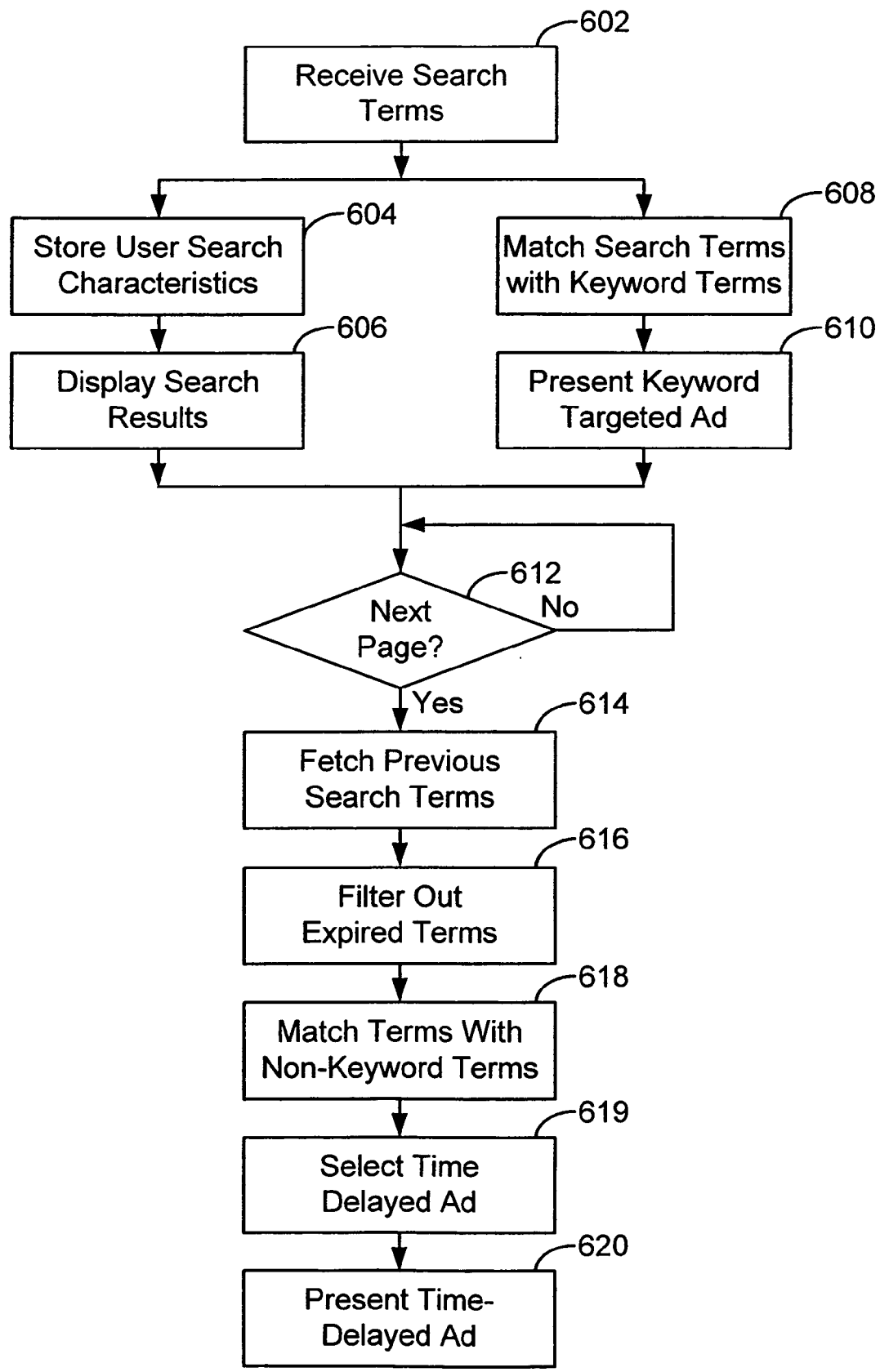
FIG. 6 is a flowchart depicting one embodiment of a method for presenting immediate and time-dependent advertisements to a user.

The immediate (i.e., keyword) and time-dependent advertisements described above are presented to a user according to an exemplary process shown in FIG. 6. At 602, a user's search query has one or more search terms are received, for example, by a web server via the Internet. At 604, the user's search terms and characteristics are stored and indexed for later use to present time-dependent advertisements associated with the search terms. Each search term is associated with a time stamp, as a characteristic, for determining when the search term is no longer available for selecting a time-dependent advertisement based upon the particular search term. At 608, the one or more received search terms are matched against keyword terms stored in an advertisement database to determine which advertisement will be presented as an immediate (i.e., keyword) advertisement. Such matching is performed, for example, by comparing each character of a text string representing the search terms with that of a text string representing the stored keyword terms. In determining the immediate (i.e., keyword) advertisement, matching at 608 is limited to those advertisements which are designated as keyword advertisements. As described above, advertisements are designated keyword advertisements when, for example, a keyword flag associated with a particular advertisement is set.

At 606, the search results are presented to the user. The results are presented to the user as a search results web page having one or more hypertext documents or hypertext links representing documents associated with the search terms of the query. The resulting hypertext links are generated, for example, by a search engine as described above. At 610, a matched keyword advertisement from 608 is presented along with the search results of 606. An exemplary presentation is embodied in a visual advertising banner; however, such presentation is not limited to visual display, but also includes audio advertisements.

After the user is presented with the search results, an accompanying immediate advertisement remains presented until the user selects a web page to view at 612. The user continues his or her research and selects the next web page, for example, by using a computer mouse to click on at least one of the displayed hypertext links. The next web page, when displayed, contains information associated with the search term queried and is accompanied by a time-dependent advertisement. At 614, previously stored search terms are fetched to determine which advertisement in the advertisement database will be presented as a time-dependent advertisement. Some stored search terms, however, are filtered out at 616 if the time stamp indicates that the search term is expired. Expired search terms are generally stale as to providing advertisements of interest to the user. In other words, the shorter the period of time between a selected web page and a previously searched search term, the more inclined a user is to click through an associated time-dependent advertisement.

At 618, the aggregation of search terms are matched against non-keyword terms (i.e., not flagged as a keyword term) similar to 608 for determining a sub-set of advertisements which may be presented as a time-dependent advertisement. At 618, a single time-dependent advertisement is selected from the sub-set of advertisements by determining which of the advertisements in the sub-set is optimal for presentation. For example, the selection process at 618 includes filtering out advertisements that are not related to a previously stored search term (i.e., advertisements not associated with advertisement types related to certain terms), and further includes maximizing revenue as well as meeting guaranteed minimum impression quotas. At 620, the time-delay advertisement is presented to the user accompanied with the content of the next web page.

Figure 7:
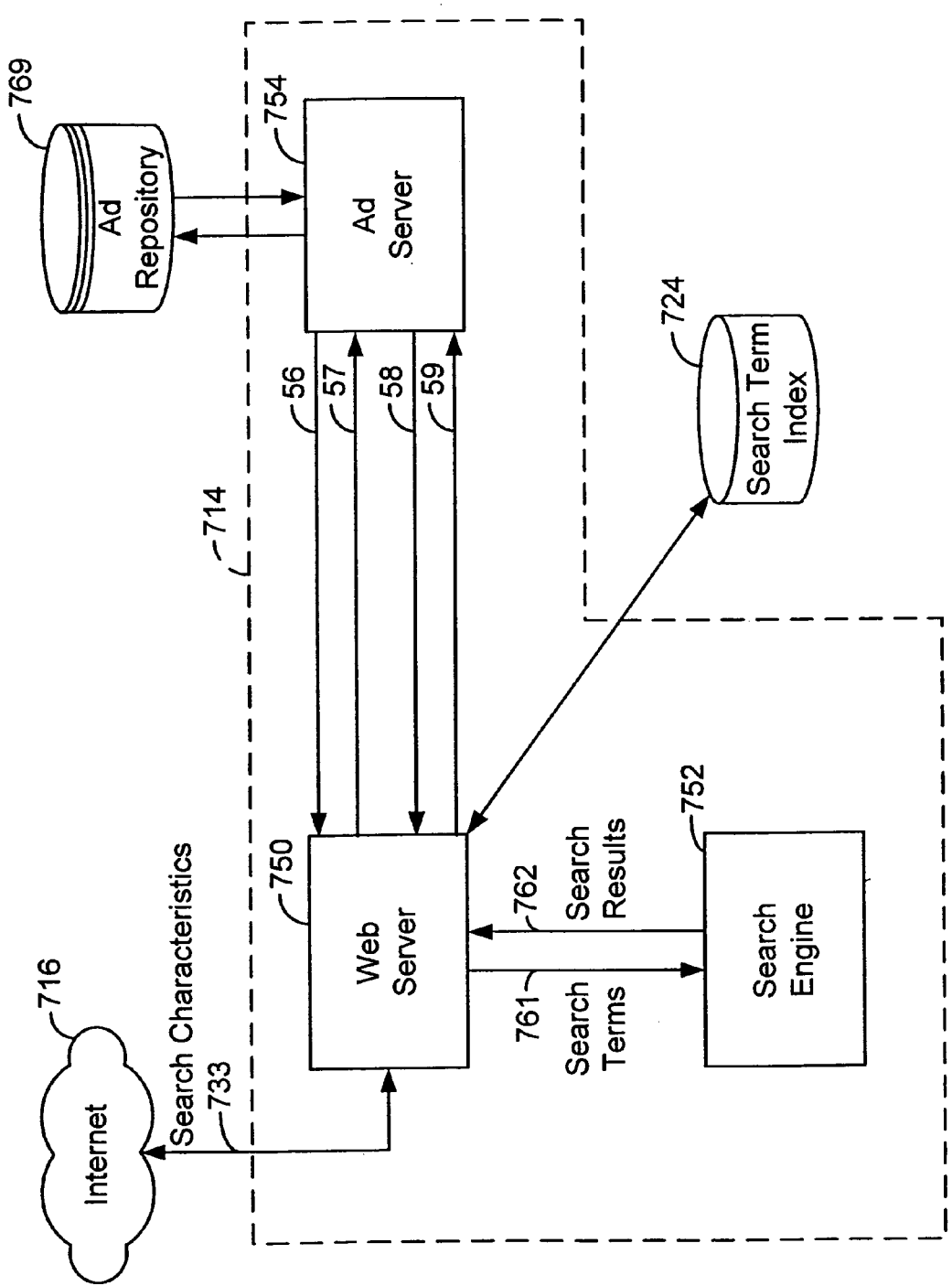
FIG. 7 is a block diagram of another embodiment of the present invention.

FIG. 7 illustrates another embodiment according to the present invention. Rather than using a user profiler of FIG. 2 to store information necessary to provide time-dependent advertisements, an exemplary user's computing system (not shown) is used to store information similarly stored in the user profiler. Referring back to FIG. 7, the search server 714 is coupled to advertisement repository 769 to request and fetch advertisements for presentation, similar to FIG. 2. Search server 714 includes a web server 750 coupled to a search engine 752, an ad server 754, and the Internet 716, also similar in function and interconnectivity to the embodiment exemplified in FIG. 2. Web server 750, among other things, provides search terms 761 to the search engine 752 for generating the search results 762.

In this example, however, search information 733 is distilled from the search characteristics entered by the user and is provided back to the user's computing system for future use. Such information includes one or more of the following: an advertisement type, a time stamp which corresponds to a previously presented keyword targeted advertisement, one or more search terms used in the user's query, and other similar types of information. Such distillation is performed, for example, by web server 750. In another example, the information stored on the user's computing system is encrypted as is known in the art of encryption.

In a specific embodiment that facilitates the previous example, search server 714 of FIG. 7 is configured to use a cookie, such as an HTTP cookie, to implement the use of time-dependent advertisements according to the present invention. A cookie is a relatively small piece of information sent by the web server 750 to a user's computing system (e.g., browser) for temporary storage. The cookie represents the same information that is stored in the user profiler 722, but the information is provided to and stored directly on each individual user's computing system instead of in a centralized database. Cookies are well known in the art of storing user information and one having ordinary skill in the art should readily appreciate how to use one or more cookies to present users with time-dependent advertisements.

In a specific embodiment, the web server 750 of FIG. 7 is electronically coupled to search term index 724. When a user's search query 733 received by web server 750 matches a term in search term index 724, wherein such a match is determined by web server 750, web server 750 further operates to transform one or more search terms into a "TD" cookie (i.e., Time Dependent cookie) and is returned to the user's computing system with search results 733. Such a TD cookie might be configured to include at least an advertisement type, a time stamp, one or more search terms of the user's query, etc.

In yet another specific embodiment, web server 750 of search server 14 is configured to use a "1×1 pixel image," such as an HTML "web bug," to initiate the issuance of a TD cookie according to the present invention. Exemplary web server 750 in this embodiment neither need be coupled to nor be required to use search term index 724. Accordingly, the 1×1 pixel image is used to issue a TD cookie. For example, if the user has previously performed a search using the search term "real estate," web server 750 inserts the following exemplary HTML tag, for example, directly into the HTML source instructions:

<img width=1 height=1 src="http://pa_yahoo_com/pa?q=real+estate"> where each of the underscores represents a "dot." The 1×1 pixel image is thus presented to the user with the search results page 733 regardless of whether the user might or might not perceive the 1×1 pixel image.

As the user's computing system displays the search results, the user's computing system (e.g., browser) initiates a contact with ad server 754, such as pa_yahoo_com ad server. Such contact may be via web server 750 or directly with ad server 754, the interconnection which is not shown. The ad server 754 matches the user's search query to a search term index 724, for example, and issues the TD cookie in the same manner as above. The use of 1×1 pixel images is well known in the art of HTTP cookies, so a detailed discussion thus is not necessary.

Figure 8:
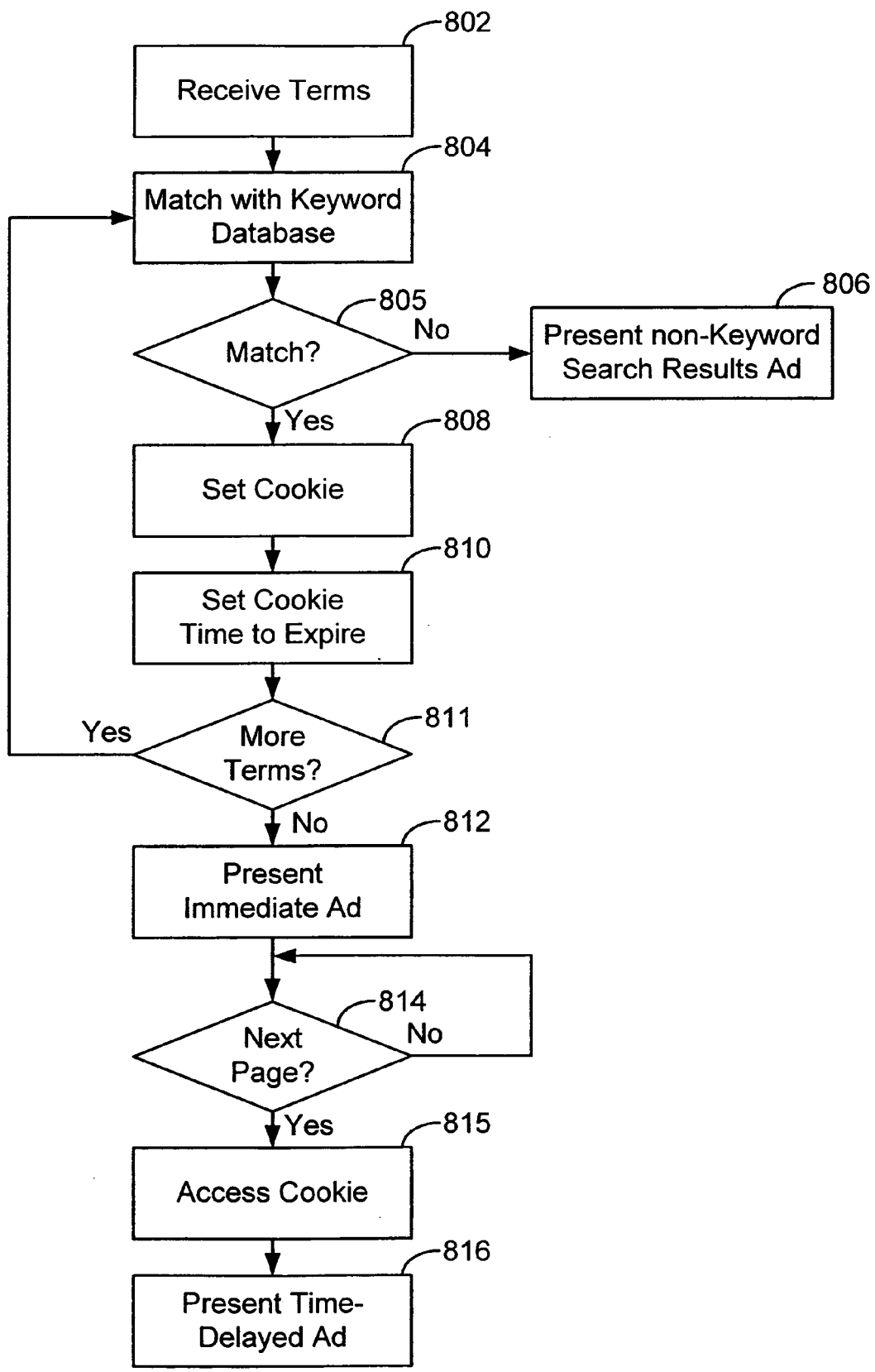
FIG. 8 is a flowchart depicting another embodiment of a method for presenting immediate and time-dependent advertisements to a user.

As shown in FIG. 8, the user's search terms are first received at 802 into a search server, for example. The search terms are then used to generate a search results page by a search engine having relevant hypertext documents. Also, the terms are used to determine whether to present an immediate advertisement accompanying the search results page. At 804, the search terms are matched against keyword terms stored in a database. If no match exists at 805, then a non-keyword term advertisement is presented at 806. In other words, if none of the search terms have been reserved by an advertiser for exclusive advertisement presentation, then another type of advertisement is presented, such as a run of the network advertisement.

If, however, a search term does match a term in the database at 805, a web server sets a TD cookie that contains an encrypted version of the ad type (i.e., categorization) of the word "shoes" at 808. In this example, it would set the following two bits on: ID=1 and ID=6, which respectively represent advertisement types "Apparel" and "Apparel/Footwear." The ID represents, for example, which bit of a bit-vector corresponds to a particular advertisement type. In one embodiment, the TD cookie is implemented using a base-64 encoded version of a bit-vector at 810 and contains a list of which bits are set.

At 811, additional search terms of the same search query are additionally matched against the advertisements in the database. If additional terms are queried, then the process is similarly repeated from 804 to 811. At 812, an immediate search advertisement is presented to the user. In one aspect of 812, if two or more search terms are reserved to different advertising entities, then the advertisement importance weighting value described above is used to determine which of the two or more corresponding immediate advertisements will be presented.

After the user has been presented the search results page and the immediate search advertisement, the search server, for example, monitors whether the user has selected a next web page for viewing at 814. If the user does select one of the presented hypertext links for display, then the stored cookie is accessed at 815, for example, by the web server to determine which advertisement from one or more groups of stored advertisements is to be presented to the user. Each group of advertisements corresponds to advertisement type IDs set in the cookie. Lastly, a time-dependent advertisement is presented to the user at 816 so long as the cookie has not expired.

To further illustrate an embodiment of the advertisement generation system, if the user then searches for "pizza" after searching for "shoes," but before the cookie expires, the TD cookie is re-issued including the new and old data. An exemplary cookie would contain ID=154 (i.e., setting ID 154 bit at 808) representing advertisement type "Food and Beverages" from the pizza query in addition to ID=1 and ID=6. If the cookie expired before the user searched for "pizza," the new TD cookie would simply contain ID=154. A search for "sushi" within the next few minutes, however, would not set the TD cookie because it, too, is categorized as ID=154, and that bit has been already set due to the pizza search query.

If a keyword term matches the search term "pizza," then the associated immediate advertisement will be presented. As the user drills down and selects a next web page for viewing, a time-dependent advertisement having an advertisement type of either "Apparel" or "Apparel/Footwear" will be available to be selected as a time-dependent advertisement. Thus, an advertisement for Doris' Clothing, Inc. is presented in lieu of a run of the network ad based upon the cookie's bits represented by ID =1 and ID =6. Such a time-dependent advertisement is presented along with the content of the selected web page by, for example, replacing "q =pizza" with the user's prior query, such as "q =shoes." Since Doris' Clothing is categorized under the advertisement type "Apparel," the prior query of "shoes" makes clothing stores available as time-dependent advertisements.

The time-dependent advertisement of the advertisement generation system is described herein with reference to a particular type of user input. More specifically, the advertisement generation system links an advertisement to a search term. It should be understood, however, that the advertisement generation system and the embodiments described herein are usable with many other types of user inputs. For example, the time-dependent advertisement may also relate to a string of text submitted by the user to the web server, such as text entered in a chat room-related web page or any other application facilitating advertising.

Figure 9:
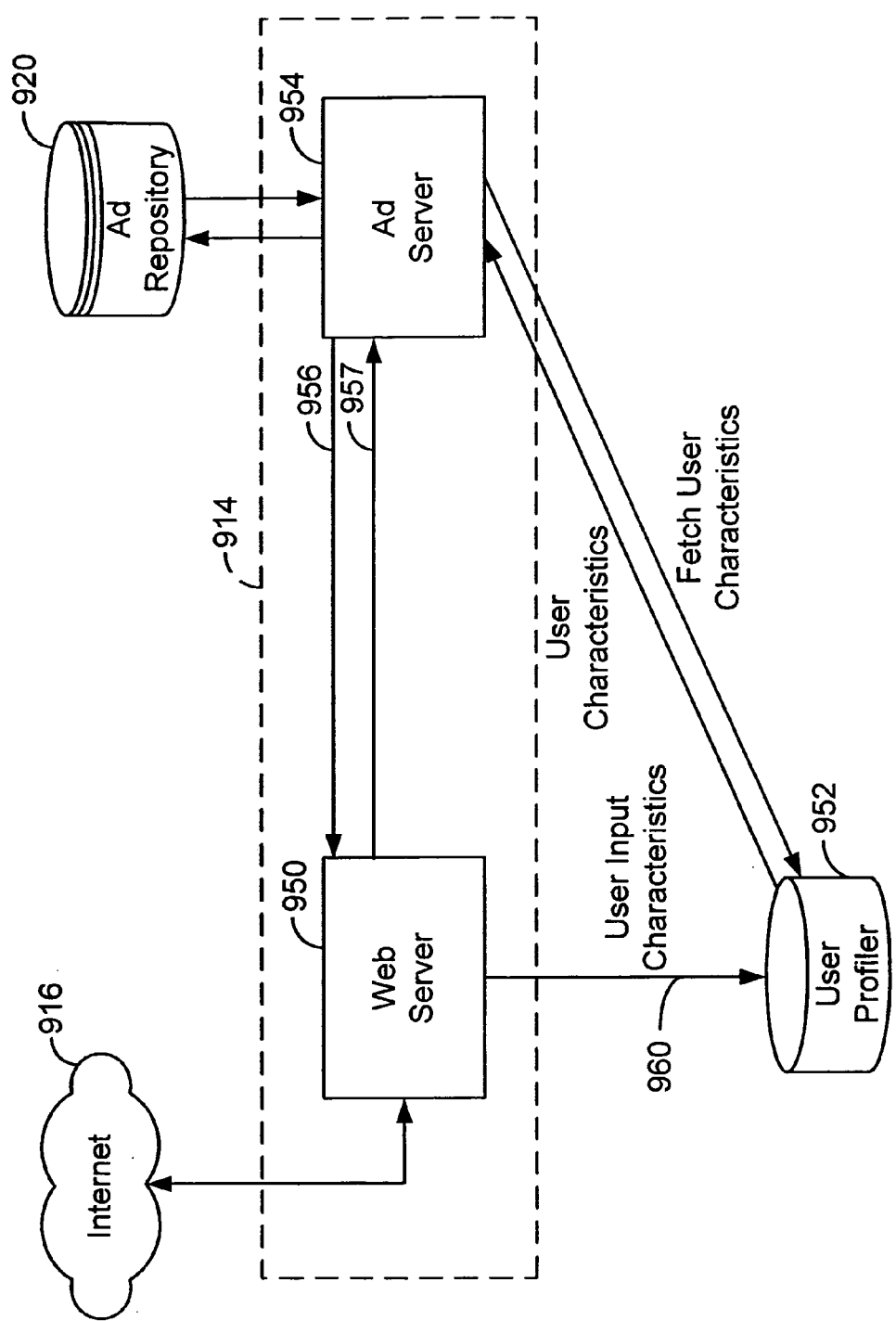
FIG. 9 is a block diagram of another embodiment of the advertisement generation system of claim 1.

FIG. 9 illustrates yet still another embodiment of an exemplary advertisement generation system of FIG. 1 which references time-dependent advertisements to user inputs rather than search terms. In the specific embodiment of the exemplary advertisement generation system, server 14 of FIG. 1 is configured as server 914 to include multiple machines, such as web server 950 and ad server 954. In one embodiment, the web server 950 is electrically coupled between user profiler 952 and ad server 954. Web server 950 is configured to receive one or more user inputs initiated by a user action over the communications network 916. User inputs include user actions such as a click on a select hypertext link, an item placed in an Internet shopping basket, text entered into a chat-room or message board, or any selection made in connection with a web page.

For each user action or input received, web server 950 determines and assigns respective user input characteristics 960 to each of the user inputs provided to the web server, including the user inputs themselves. Such characteristics contain a user ID associated with particular user action or input. Another user input characteristic is a time stamp associated with particular terms and indicates the time at which the user input was received by web server 950. The user characteristics are stored in user profiler 952 where the user profiler 952 has a data structure similar to the embodiment depicted in FIG. 3. According to this embodiment, however, search term 76 of FIG. 3 is replaced, or is supplemented with predetermined user inputs in other characteristics 78. Although not shown in FIG. 8, it should be understood that the search term index 24 of FIG. 4 is configurable to include the predetermined user inputs for indexing the user inputs to advertisement types 29 and may be used with this exemplary system.

Referring back to FIG. 9, ad server 954 operates to determine which of one of the advertisements is to be retrieved from advertisement repository 920 for presentation to the user. When ad server 954 receives a request for a time-dependent ad 957 from web server 950, it uses user characteristics from user profiler 952 to select which one of the many advertisements in the repository 920 is to be presented. The selected advertisement 956 is then sent to the web server for communication to the user.

By way of example, suppose an on-line shopper is viewing a Yahoo! Shopping web page which displays a lamp for sale. If the shopper clicks (i.e., selects) "add to cart" to purchase the item, the shopper's action of clicking a shopping cart button (i.e., user input) is stored in a user profile record associated with that user. As the shopper navigates through other web pages during a period of time, the web server will request a time-dependent advertisement from the ad server. The ad server will select an advertisement from the ad repository based upon on at least the shopper's previous inputs. Thus, the ad server will select a time-dependent ad related to, for example, "lamps," "lamp merchants," or "shopping malls," or any other advertisement linked to the shopper's user input.

The above description is illustrative and not restrictive. Many variations of the invention will become apparent to those of skill in the art upon review of this disclosure. The advertisement generation system also has utility in presenting time-dependent advertisements associated with text entered in chat room-related or message board web pages by particular user. For example, a user might ask other users in a chat room their opinions on the best brand name automobiles for purchase. In such a case, a car dealer, as an advertiser, may present a time-dependent advertisement after the user leaves the chat room for a next web page. Furthermore, the present invention may present an audio advertisement related to the type of music to which a user has listened recently. For example, when a user leaves a first web page presenting streaming audio to the user for a next web page, a time-dependent audio ad may be presented to the user at some later time. In addition, the present invention is not limited to providing time-dependent advertisements, but may also provide a time-dependent object such as text, pictures, music, programs, etc. that is linked to a user input. For example, a graphic having content related to a user input may be presented to a user at a later time (i.e., time-delayed or time-dependent) in lieu of or in addition to a time-delay advertisement. The scope of the invention should, therefore, be determined not with reference to the above description, but instead should be determined with reference to the appended claims along with their full scope of equivalents.

What is claimed is:

1. In a computer system that generates hypertext pages, or representations thereof, for presentation to users at user computing devices, wherein the hypertext pages include at least references to advertisements that are to be displayed on the user computing devices along with other portions of the hypertext pages and wherein the advertisements are stored in electronic form, a method for presenting advertisements to a user by presenting a hypertext page for display on at a corresponding user computing device, wherein the advertisements are selected from a plurality of advertisements, the method comprising:

accepting a first set of search terms at the computer system from the user, directly or indirectly;

determining a search result based upon the first set of search terms;

storing a representation of at least part of the first set of search terms such that it is electronically accessible to the computer system;

sending a user computing device a first search result page representing a search result resulting from a search using at least a part of the stored representation, the first search result page including an immediate advertisement selected from the electronically stored advertisements based on one or both of the first set of search terms and at least a part of the stored representation;

selecting a future advertisement from the electronically stored advertisements based on at least the stored representations of the first set of search terms and on at least an approximation of a time difference between a time of display of the first search result page and a display time for a later page; and presenting, at the user computing device, the future advertisement to the user as part of the later page presented at the user computing device subsequent to the viewing of the first search result page.

2. The method of claim 1, wherein storing the first set of search terms includes storing a representation of at least one search term in a user profiler.

3. The method of claim 1, wherein storing the first set of search terms includes storing a representation of at least one search term in a cookie.

4. The method of claim 1, wherein storing the first set of search terms further comprises associating at least one search term data element number to the stored first search term.

5. The method of claim 4, wherein selecting the future advertisement further comprises:
  assigning an advertisement ID data element number to each of the plurality of advertisements, where the advertisement ID data element number is associated with an advertising type in an advertisement data structure;
  comparing the search term data element number with the advertisement ID data element number; and
  matching the data element number to the advertisement ID data element number when the data element number is equivalent to the advertisement ID data element number;
  wherein the matched advertisement ID data element number associated with the advertising type is used to select the future advertisement for presentation to the user.

6. The method of claim 1, further comprising accepting a second set of search terms;
  determining a second search result based upon the second set of search terms;
  storing a representation of at least part of the second set of search terms;
  presenting the later page including at least a part of the second search result and the future advertisement;
  selecting a next future advertisement based on at least the stored representations of the first set of search terms and the second set of search terms; and
  presenting the next future advertisement as part of a next later page subsequent to the viewing of the later page.

7. The method of claim 6 wherein the next future advertisement is available for selection during a next period of time after accepting the first and the second search terms.

8. The method of claim 1, wherein the later page viewed is a web page.

9. The method of claim 1, wherein the future advertisement is shown only if the later page is requested within a time frame.

10. The method of claim 1, wherein the selecting step occurs following receipt of a request from the user for the later page.

11. The method of claim 1, wherein the selecting step further comprises filtering advertisements from which the future advertisement is selected, the filtering based on at least time of search values, indicative of when search terms were used, and a time of filtering.

12. A method for presenting to a user a future advertisement from a plurality of advertisements, the method comprising:
  receiving a search term of a search query into a search engine;
  generating a search results web page including a plurality of documents, where the plurality of documents include a hypertext link for a next web page;
  determining at least one advertisement type based on the search term;
  setting an expiration period of time based on a time that the search term was received;
  selecting one of the plurality of documents to view;
  matching the advertisement type with at least one representation of a plurality of advertisements, where the advertisement type is associated with a subset of the advertisements;
  selecting the future advertisement from the subset of the advertisements; and
  presenting the future advertisement to the user, wherein the future advertisement is available for selection during the set expiration time.

13. The method of claim 12, wherein determining the at least one advertisement type further comprises setting a cookie to include data representing the at least one advertisement type upon a match.

14. The method of claim 13, wherein setting the expiration time includes setting the expiration time for the cookie.

15. The method of claim 13, wherein selecting one of the plurality of documents further comprises accessing the cookie to retrieve the data representing the advertisement type.

16. An advertisement generation system for presenting a future advertisement to a user based upon a first set search terms of a search query comprising:
  a web server including a search engine and configured to receive the search query from the user and configured to present a search results page containing search query results from the search engine, the search results page including an immediate advertisement;
  a user profiler configured to communicate a representation of one or more search characteristics associated with the search query to the search engine, the user profiler including a profiler data structure to store the one or more search characteristics where the search characteristics include the first set of search terms; and
  an advertisement server coupled to the web server and the user profiler, where the advertisement server is configured to select the future advertisement based upon the first set of search terms and at least one characteristic of a page viewed subsequent to the search results page, the page viewed subsequent including the future advertisement.

17. The system of claim 16, wherein the future advertisement is available for presentation to the user until a period of time expires.

18. The system of claim 16 further comprising an advertisement repository having logic and a repository data structure to store data representing a plurality of advertisements, the plurality of advertisements including the advertisement.

19. The system of claim 16, wherein the search characteristics further comprises a user identifier and a time stamp, where the time stamp indicates the time at which the user uses the first set of search terms in the search query.

20. The advertisement generation system of claim 16, wherein the advertisement server further comprises:
  storage for time of search values, including at least a time of search value for the first set of search terms; and
  logic for determining when a difference between a time of serving the future advertisement and the time of search value exceeds a threshold difference and for using that threshold difference in at least one determination in selecting the future advertisement.

21. The advertisement generation system of claim 16, wherein the at least one characteristic of the page viewed subsequent to the search results page is a time of viewing of the page viewed subsequent.

22. An advertisement generation system for presenting a future advertisement to a user based upon a first user input associated with a first web page comprising:
- a web server configured to receive the first user input and configured to present the first web page, wherein the first web page is responsive to the first user input, the first web page including an immediate advertisement;
- a user profiler configured to communicate a representation of at least one user input characteristic associated with the first user input, the user profiler including a profiler data structure to store the at least one user input characteristic; and
- an advertisement server coupled to the user profiler and to the web server, where the advertisement server is configured to select a future advertisement based upon the at least one user input characteristic and at least one characteristic of the first web page, wherein a second web page viewed subsequent to the first web page would include the future advertisement.

23. The system of claim 22, further comprising an advertisement repository having logic and a repository data structure to store data representing a plurality of advertisements, the plurality of advertisements including the future advertisement.

24. The system of claim 22, wherein the future advertisement is available for presentation to the user with the second web page until a period of time expires.

25. The system of claim 22, wherein the at least one user input characteristic includes text entered in a chat room.

26. The system of claim 22, wherein the at least one user input characteristic includes an item purchased.

27. The advertisement generation system of claim 22, wherein the advertisement server further comprises:
- storage for time of input values, including at least a time of input value for the first user input; and
- logic for determining when a difference between a time of serving the future advertisement and the time of input value exceeds a threshold difference and for using that threshold difference in at least one determination in selecting the future advertisement.

28. The advertisement generation system of claim 22, wherein the at least one characteristic of the second web page is a time of viewing of the second web page.

* * * * *